US009407060B2

(12) United States Patent
Fertig et al.

(10) Patent No.: US 9,407,060 B2
(45) Date of Patent: Aug. 2, 2016

(54) MUTUALLY-REFERENCED OPTICAL FREQUENCY COMBS

(71) Applicant: Honeywell International Inc., Morristown, NJ (US)

(72) Inventors: Chad Fertig, Bloomington, MN (US); Steven Tin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/549,359

(22) Filed: Nov. 20, 2014

(65) Prior Publication Data

US 2015/0325978 A1 Nov. 12, 2015

Related U.S. Application Data

(60) Provisional application No. 61/990,023, filed on May 7, 2014.

(51) Int. Cl.
| | |
|---|---|
| *H01S 3/00* | (2006.01) |
| *H01S 3/13* | (2006.01) |
| *G01B 9/02* | (2006.01) |
| *G02F 2/02* | (2006.01) |
| *H04B 10/50* | (2013.01) |

(52) U.S. Cl.
CPC .............. *H01S 3/13* (2013.01); *G01B 9/02008* (2013.01); *G02F 2/02* (2013.01); *H04B 10/506* (2013.01); *G02F 2203/56* (2013.01)

(58) Field of Classification Search
CPC ..... H04B 10/506; G02F 2203/56; H01S 3/13; H01S 3/05; H01S 2203/56; G01B 9/02008
USPC ........................................................ 359/333
See application file for complete search history.

(56) References Cited

U.S. PATENT DOCUMENTS

| | | |
|---|---|---|
| 5,233,462 A | 8/1993 | Wong |
| 6,798,796 B2 | 9/2004 | Hiroshi et al. |
| 7,123,402 B1 | 10/2006 | Doerr et al. |
| 8,378,751 B2 | 2/2013 | Fagg |
| 8,416,819 B2 | 4/2013 | Grebing et al. |
| 8,488,639 B1 | 7/2013 | Diels et al. |

(Continued)

FOREIGN PATENT DOCUMENTS

WO 2013040168 3/2013

OTHER PUBLICATIONS

Del'Haye et al., "Self-Injection Locking and Phase-Locked States in Microresonator-Based Optical Frequency Combs", "Physical Review Letters 112", Jan. 29, 2014, Publisher: The American Physical Society.
Del'Haye et al., "Pulse-Picked Octave-Spanning Microresonator-Based Frequency Comb for Optical Self-Referencing", May 2013, p. 1, Publisher: Notional Institute of Standards and Technology.
Hsieh et al., "Spectrally interleaved, comb-mode-resolved spectroscopy using swept dual terahertz combs", "Scientific Reports", Jan. 22, 2014, pp. 1-7.

(Continued)

*Primary Examiner* — Mark Hellner
(74) *Attorney, Agent, or Firm* — Fogg & Powers LLC (57) ABSTRACT

Embodiments herein provide for an optical frequency reference including a fine optical frequency comb and a coarse optical frequency comb. The fine comb has a first tooth and a frequency spacing (FCS) between teeth that is locked to a fractional or integer multiple of a radio frequency reference. The coarse comb has a second tooth that is locked to the first tooth and a frequency spacing (CCS) between teeth that is locked to an integer multiple of the FCS. An absolute optical frequency of at least one tooth of the coarse optical frequency comb is set.

20 Claims, 6 Drawing Sheets

(56) References Cited

U.S. PATENT DOCUMENTS

| | | | |
|---|---|---|---|
| 8,558,993 B2 | 10/2013 | Newbury et al. | |
| 8,564,785 B2 * | 10/2013 | Newbury | G01J 3/453 356/451 |
| 8,565,609 B2 | 10/2013 | Wilkinson et al. | |
| 8,750,717 B1 * | 6/2014 | Yap | G02F 2/02 398/158 |
| 2004/0018018 A1 * | 1/2004 | Izadpanah | F16K 37/0075 398/77 |
| 2004/0264977 A1 * | 12/2004 | Yap | G02F 2/02 398/161 |
| 2008/0285606 A1 | 11/2008 | Kippenberg et al. | |
| 2013/0314703 A1 | 11/2013 | Cox | |
| 2015/0326320 A1 | 11/2015 | Fertig et al. | |

OTHER PUBLICATIONS

Klee et al., "Self-referenced Spectral Phase Retrieval of Dissimilar Optical Frequency Combs via Multiheterodyne Detection", Sep. 2012, pp. 491-492, Publisher: IEEE.

Lee et al., "Discretely Tunable Optical Frequency Synthesizer Utilizing a Femtosecond Fiber Laser Injection-Locking Technique", "IEEE Photonics Technology Letters", Oct. 1, 2009, pp. 1435-1437, vol. 21, No. 19.

European Patent Office, "Extended European Search Report from EP Application No. 15164564.5 mailed Oct. 15, 2015", from Foreign Counterpart of U.S. Appl. No. 14/549,359, filed Oct. 15, 2015, pp. 1-6, Published in: EP.

U.S. Patent and Trademark Office, "Notice of Allowance", from U.S. Appl. No. 14/549,374, filed Mar. 8, 2016, pp. 1-26, Published in: US.

* cited by examiner

MUTUALLY-REFERENCED OPTICAL FREQUENCY COMBS

CROSS-REFERENCE TO RELATED APPLICATIONS

This application claims the benefit of U.S. Provisional Patent Application Ser. No. 61/990,023, filed on May 7, 2014, which is hereby incorporated herein by reference.

BACKGROUND

Accurate, tunable optical synthesis has potential applications in standoff effluent characterization, high-bandwidth and secure communications, optical spectroscopy, gas sensing, LiDAR, optical-carrier atomic clocks, and atomic and optomechanical inertial sensors. Current state-of-the-art optical synthesizers are limited to laboratory use due to the size, cost, and power requirements.

Optical synthesizers that achieve accurate and stable optical output over a wide range (such as the C-band optical communications range of 1530-1565 nm), have output light that is locked to a highly stable and accurate optical reference with feedback control in the radio frequency (RF) domain. For large scale optical synthesizers, self-referenced optical frequency combs based on titanium-sapphire or fiber-laser based femtosecond mode-locked laser sources are used to reference optical output to microwave inputs, enabling optical synthesis. These devices are available commercially, are as large as a refrigerator, and use large amounts of power.

Significant efforts have been taken in the last few years to develop self-referenced optical frequency combs based on micro-resonators, which use much less power to operate than the tradition mode-locked laser based optical frequency combs. However, optical frequency combs operate by self-referencing in an optical interferometer. This has not been achieved using micro-resonators because of an inability to control micro-resonators with fine comb tooth spacing while simultaneously being excited with laser power in excess of 1 watt, which is used to create combs wide enough (e.g., octave spanning) to self-reference.

SUMMARY

Embodiments herein provide for an optical frequency reference including a fine optical frequency comb and a coarse optical frequency comb. The fine comb has a first tooth and a frequency spacing (FCS) between teeth that is locked to a fractional or integer multiple of a radio frequency reference. The coarse comb has a second tooth that is locked to the first tooth and a frequency spacing (CCS) between teeth that is locked to an integer multiple of the FCS. An absolute optical frequency of at least one tooth of the coarse optical frequency comb is set.

DRAWINGS

Understanding that the drawings depict only examples and are not therefore to be considered limiting in scope, the examples will be described with additional specificity and detail through the use of the accompanying drawings.

In accordance with common practice, the various described features are not drawn to scale but are drawn to emphasize specific features relevant to the examples. Like reference numbers and designations in the various drawings indicate like elements.

DETAILED DESCRIPTION

The subject matter described herein provides for an optical frequency reference based on two mutually-referenced optical frequency combs. The mutually-referenced optical frequency combs can achieve a stable optical frequency reference over a wide tuning range with reduced laser power requirements.

Figure 1:
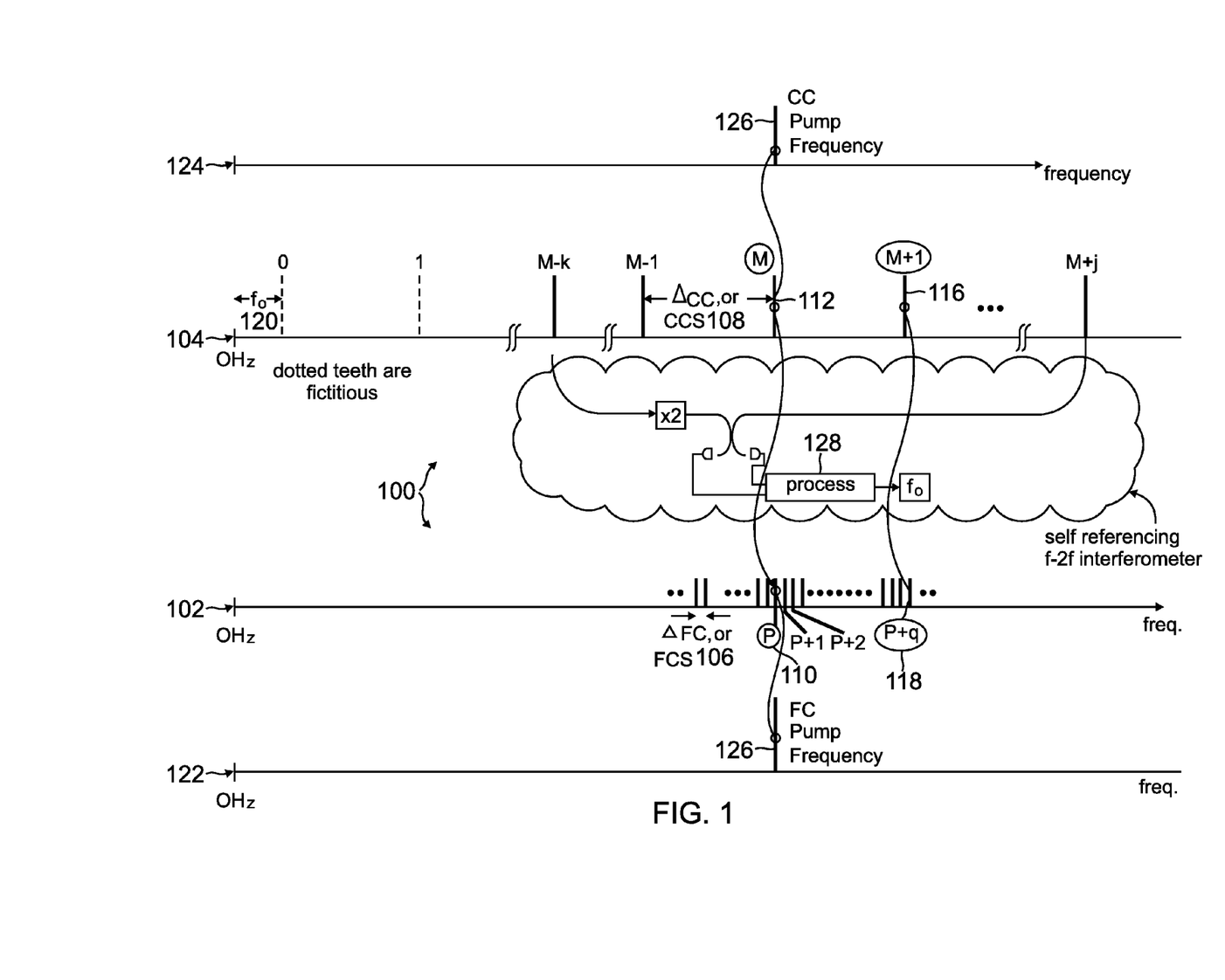
FIG. 1 is a diagram illustrating an example of two mutually-referenced optical frequency combs.

FIG. 1 is a diagram illustrating such mutually-referenced optical frequency combs 100 (also referred to herein as simply "combs 100"). The combs 100 include a fine optical frequency comb (FC) 102 and a coarse optical frequency comb (CC) 104. The FC 102 has a relatively fine spacing while the CC 104 has a comparatively coarse spacing. Since the power required to generate an optical comb increases as the number of teeth increases, using the coarse comb 104 in conjunction with the fine comb 102 can reduce the optical power required to generate a stable, high frequency fine comb, because a single optical frequency comb is not needed to achieve both wide output range and narrow tooth spacing. In particular, mutually referencing the combs 100 allows for the frequencies of the fine comb teeth to be unambiguously identified even if the wavelength of the fine comb pump laser 122 is not known a priori to an accuracy better than the tooth spacing of the fine comb 102.

Figure 2:
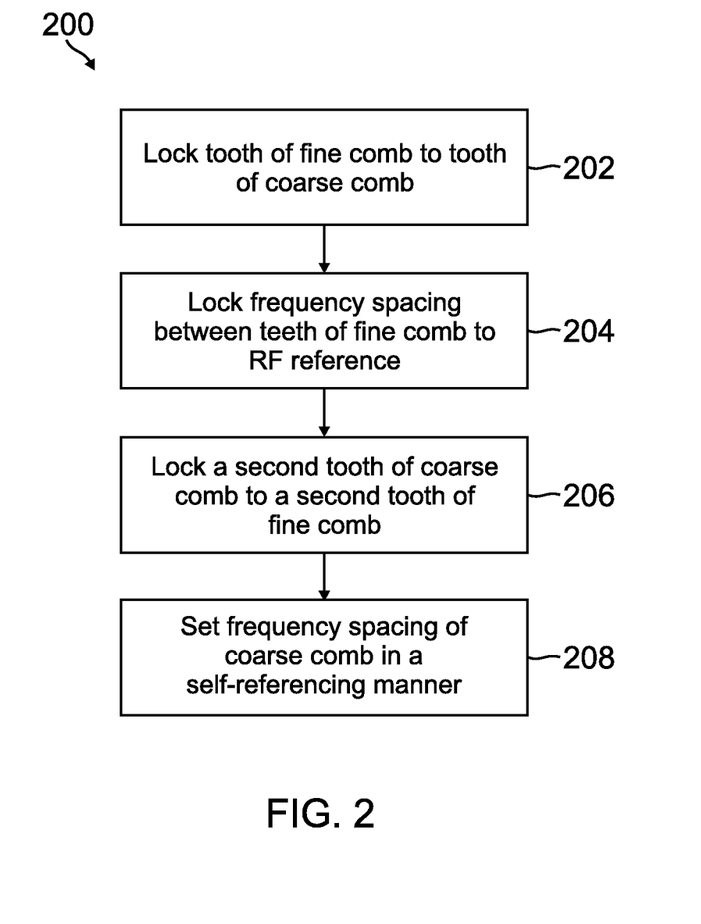
FIG. 2 is a flow diagram of an example method of mutually-referencing two optical frequency combs.
Figure 3:
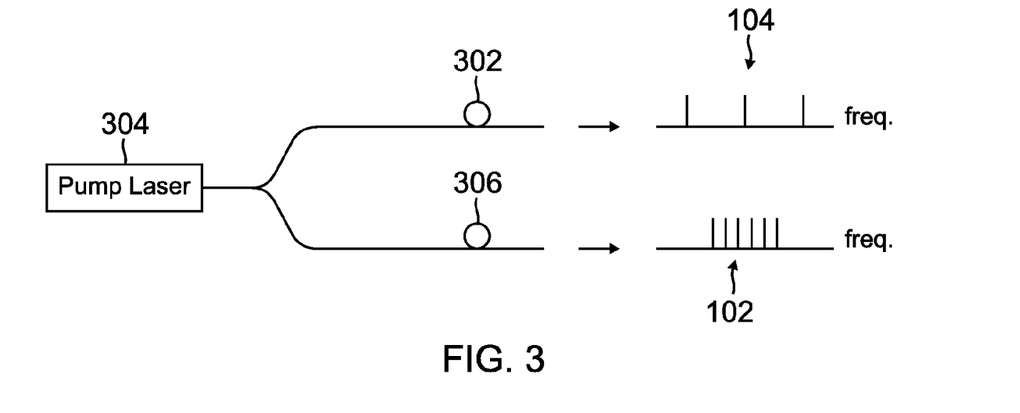
FIG. 3 is a diagram illustrating an example system for implementing the mutually-referenced optical frequency combs of FIG. 1.
Figure 4:
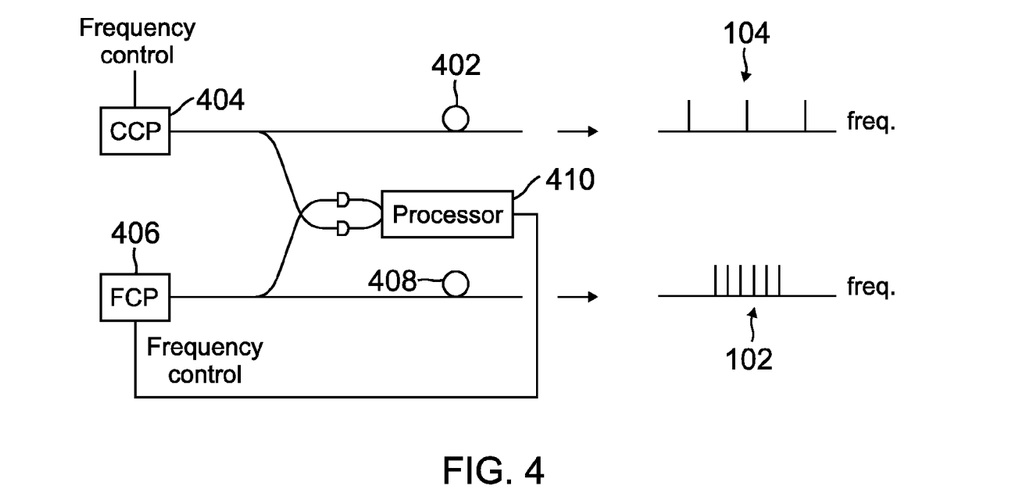
FIG. 4 is a diagram illustrating another example system for implementing the mutually-referenced optical frequency combs of FIG. 1.

FIG. 2 is a block diagram of an example method 200 of mutually-referencing the FC 102 and the CC 104. The method 200 includes locking a first tooth 110 of order number "p" and having a frequency f(p) 110 of the FC 102 to a second tooth 112 or order number "m" and having a frequency f(m) of the CC 104 (block 202). FIGS. 3 and 4 illustrate respective examples of means of generating a FC 102 having a first tooth 110 that is locked to a second tooth 112 of the CC 104.

In the example shown in FIG. 3, the CC 104 can be generated by pumping a resonator 302 (e.g., a micro-resonator) for the CC 104 with a pump laser 304. The FC 102 can also be generated from the pump laser 304. In the implementation shown in FIG. 3, the FC 102 is generated by pumping a resonator 306 (e.g., a micro-resonator) for the FC 102 with the pump laser 304. In an alternative implementation, the FC 102 can be generated by providing the signal from the pump laser 304 to a modulator. In another alternative implementation, the FC 102 can be generated by providing the signal from the pump laser 304 to a modulator, and providing an output from the modulator to a resonator. In any case, generating the FC 102 and CC 104 with the same pump laser 304, causes the first tooth 110 of the FC 102 to be locked to the second tooth 112 of the CC 104.

In an alternative example shown in FIG. 4, the CC 104 can be generated by pumping a resonator 402 (e.g., a microresonator) for the CC 104 with a first pump laser 404 and by generating the FC 102 with a second pump laser 406. In the implementation shown in FIG. 4, the FC 102 is generated by pumping a resonator 408 (e.g., a micro-resonator) for the FC 102 with the second pump laser 406. In an alternative implementation, the FC 102 can be generated by providing the signal from the second pump laser 406 to a modulator. In another alternative implementation, the FC 102 can be generated by providing the signal from the second pump laser 406 to a modulator, and providing an output from the modulator to a resonator. In any case, the first tooth 110 of the FC 102 can be locked to the second tooth 112 of the CC 104 in the example shown in FIG. 4 by controlling the second pump laser 406 such that the second pump laser 406 is locked to the first pump laser 404. In particular, a processing device 410 along with appropriate detectors can be configured to detect differences in the frequency between the first pump laser 404 and the second pump laser 406 and to control the second pump laser 406 based thereon to lock the second pump laser 406 to the first pump laser 404.

Referring back to FIG. 1, regardless of whether the FC 102 and the CC 104 are generated using one pump laser or two pumped lasers locked to one another, at least one tooth of the FC 102 and CC 104 will be at the common frequency 126 of the pump laser(s) 122, 124. In the example shown in FIG. 1, two of those teeth are the first tooth 110 of the FC 102 and the second tooth 112 of the CC 104.

In addition to locking two of the tooth frequencies 110, the method 200 also includes locking a frequency spacing (FCS) 106 between teeth of the FC 102 to an integer or fractional multiple of a radio frequency (RF) reference (block 204). In one example, the radio frequency reference is used to directly modulate the fine comb pump laser 304, 406, creating a FC 102 having an FCS 106 equal to a fractional or integer multiple of the RF reference. In another example, the FCS 106 is detected using radio frequency electronics, and stabilized to a radio frequency reference by closed loop control of the fine comb resonator free spectral range. The FCS 106 of the FC 102 is selected to be small enough such that the FCS 106 can be within the desired error range based on locking the FCS 106 to a stable RF reference. In an example, the stable RF reference is at 10 MHz, and the FCS 106 is generated based on fractional or integer multiple of 10 MHz, such as 20 GHz.

Even if the FCS 106 is known, however, the absolute frequency of any given tooth in the FC 102 is not known based on the above alone. Accordingly, another item of the mutually locked combs 102, 104 is that a frequency spacing (CCS) 108 between teeth of the CC 104 is locked to an integer multiple of the FCS 106. In an example, the FCS 106 is 20 GHz and the integer multiple is 50 such that the CCS 108 is 1000 GHz. The width of the FC 102 and the CCS 108 are selected such that the teeth of the FC 102 span at least the CCS 108 to enable such a lock.

The CCS 108 can be locked to an integer multiple of the FCS 106 by locking a third tooth 116 of order number m+1 of the CC 104 to a fourth tooth 118 of order number p+q of the FC 102 (block 206). By locking the third tooth 116 to the fourth tooth 118 along with locking the second tooth 112 to the first tooth 110, the CCS 108 is locked to an integer multiple of the FCS 106. In an example, the third tooth 116 is an adjacent tooth to the second tooth 112 such that the third tooth 116 is separated from the second tooth by the CCS 108. In such an example, the CCS 108 is locked to an integer multiple q of the FCS 106. In an example, the third tooth 116 is locked to the fourth tooth 118 by setting a free spectral range (FSR) of a resonator for the CC 104 such that a beat frequency between an output of the FC 102 and an output of the CC 104 indicates the coincidence of the frequencies of the third tooth 116 and the fourth tooth 118.

In an example, the third tooth 116 can be locked to the fourth tooth 118 by sweeping the FSR of the resonator 302, 402 for the CC 104. The fourth tooth 118 can be selected from any desired tooth of the FC 102 that permits locking to the third tooth 116. The FSR of the resonator 302, 402 can be swept, for example, by temperature tuning the cavity length or by other means. While the FSR of the resonator 302, 402 is swept, the radio frequency, f(beat), of the optical beat note between the FC 102 and the CC 104 is monitored.

Figure 5A:
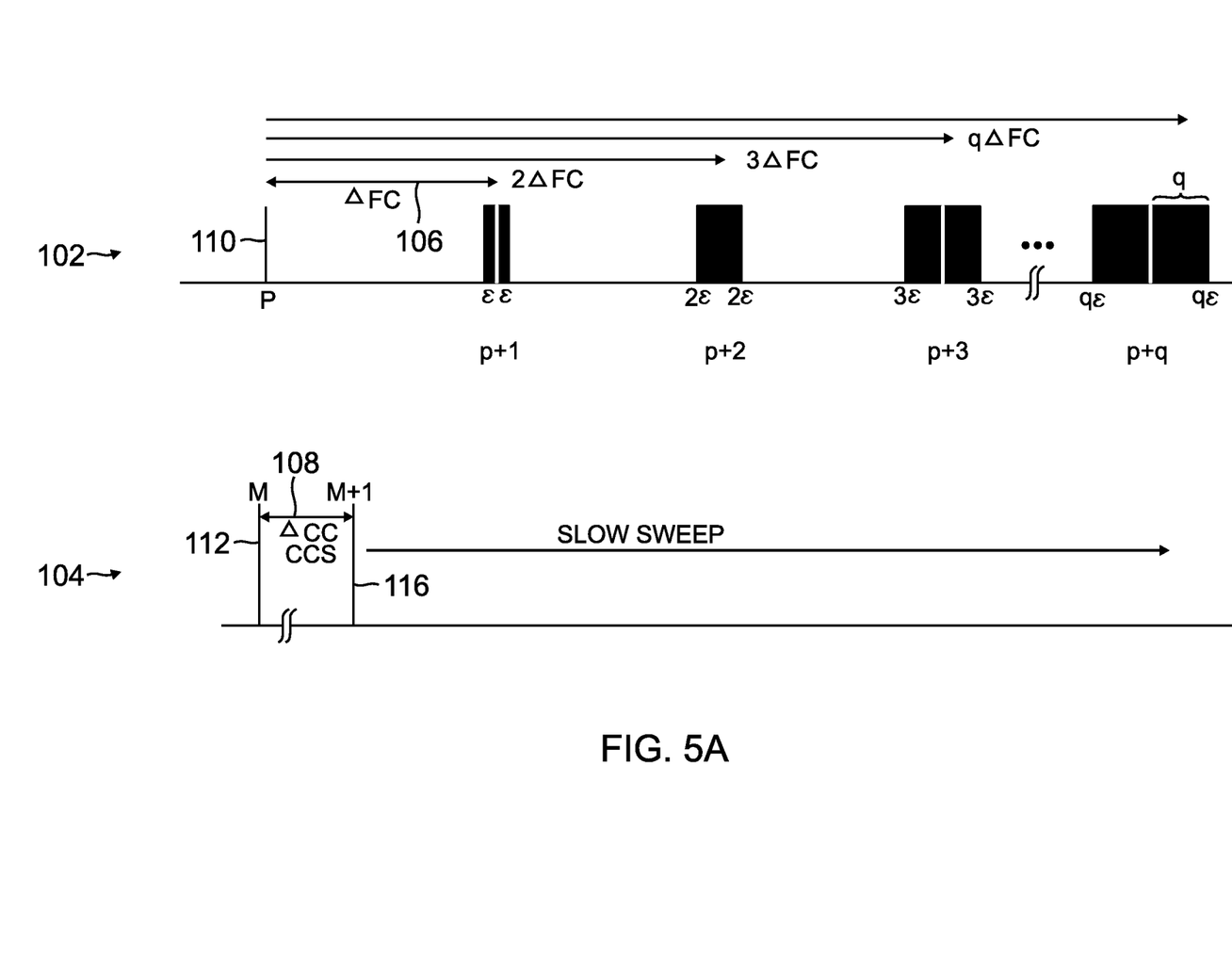
FIG. 5A is a graph illustrating an example of sweeping of the free spectral range of a resonator for the coarse comb of FIG. 1 with respect to several teeth of the fine comb of FIG. 1.

FIG. 5A is a graph illustrating an example of sweeping of the FSR of the resonator 302, 402, for the CC 104 with respect to several teeth of the FC 102. As shown, sweeping the FSR of the resonator 302, 402 causes the CCS 108 change. With tooth m (e.g., the second tooth 112) of the CC 104 locked to tooth p (e.g., the first tooth 110) of the FC 102, the m+1 tooth (e.g., the third tooth 116) of the CC 104 moves across the p+1, p+2, p+3, etc. teeth of the FC 102. The m+1 tooth 116 can then be locked to any tooth (p+1, p+2, p+3) of the FC 102 based on the rate of change of the frequency of the beat note between the FC 102 and the CC 104, as the CCS 108 is varied with respect to the FC 102. In particular, as the m+1 tooth 116 sweeps across the teeth of the FC 102, the racing rate (RR), $$RR = \frac{df(beat)}{dFCS},$$

of the beat note is monitored.

Figure 5B:
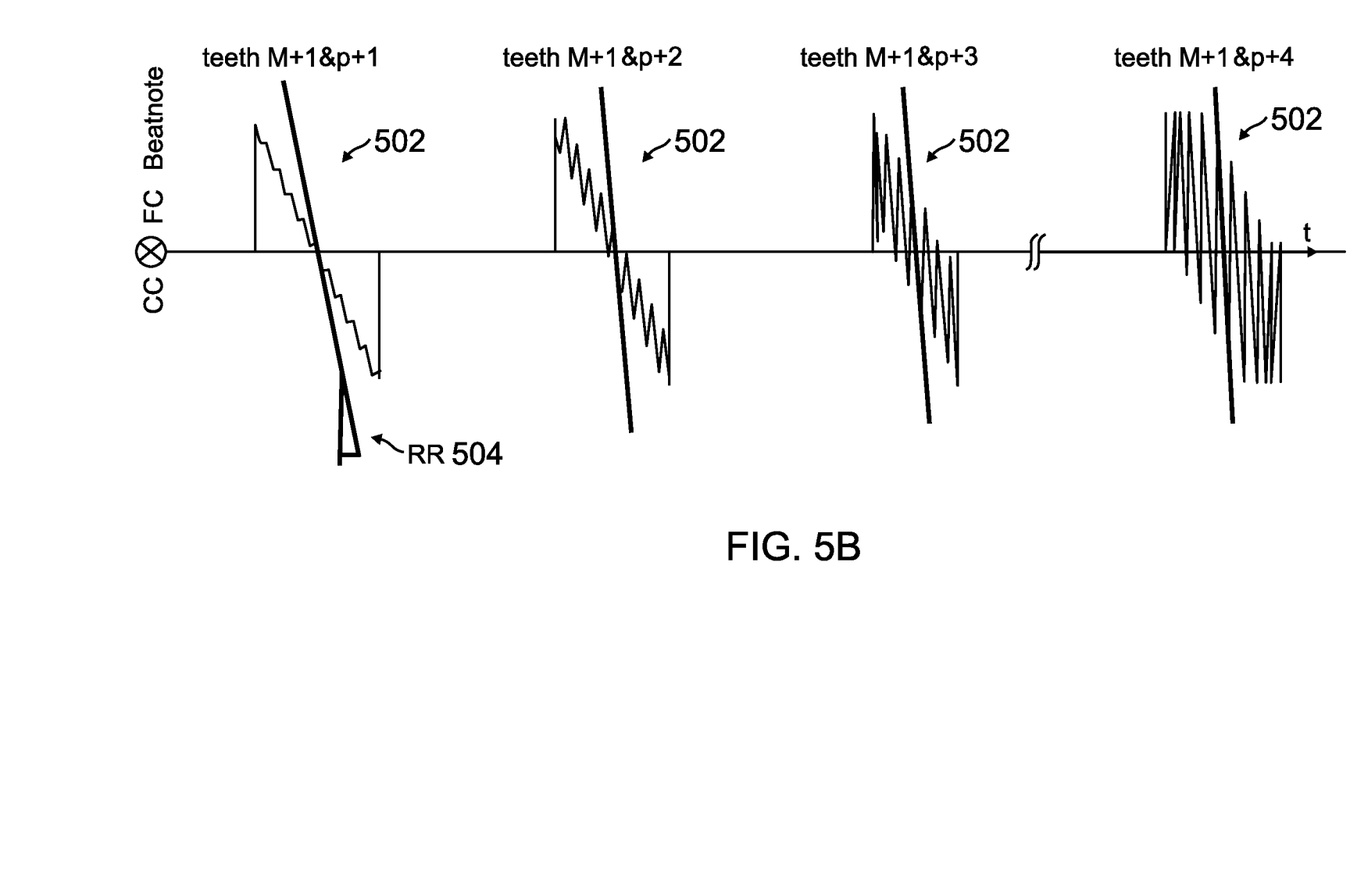
FIG. 5B is a graph illustrating an example of a beat note between the coarse comb of FIG. 1 and the fine comb of FIG. 1 as the free spectral range of the resonator for the coarse comb is swept.

FIG. 5B is a graph illustrating an example of the racing rate. In an example, the racing rate can be monitored by applying a small dither to the FCS 106. The dither of the FCS 106 generates a sawtooth shape on the beat note 502 between the FC 102 and the CC 104. The racing rate 504 is the slope of the downward edge of the sawtooth shape in the beat note 502. The racing rate 504 has a value that depends proportionately on the number of teeth "q" between the p tooth 110 and the tooth (p+1, p+2, p+3, etc.) of the FC 102 upon which the m+1 tooth 116 of the CC 104 is interfering with to create the beat note. In particular, the racing rate 504 moves closer to infinity (a vertical slope) the farther the tooth (p+1, p+2, etc.) of the FC 102 that is interfering with the m+1 tooth 116 of the CC 104 is away from the p tooth 110. Based on this phenomenon, it can be determined when the m+1 tooth 116 of the CC 104 is overlapping with the tooth (fourth tooth) 118 of the FC 102 in which it is desired to lock the m+1 tooth to. In particular, RR=b·q, for some constant b which depends on the method of dithering the FCS 106. When the m+1 tooth 116 overlaps the desired (fourth) tooth 118, the racing rate equals a predetermined value for the fourth tooth 118. At that point, a servoloop can be engaged which holds the FSR of the resonator 302, 402 of the CC 104 to lock the third tooth 116 to the fourth tooth 118. Once this occurs, all of the teeth of the CC 104 are spaced by the integer multiple of the FCS 106. Notably, this can be accomplished without having to detect a beat note having a frequency of the CCS 108.

The frequency offset 120 of the CC 104 is also set. In an example, the frequency offset 120 is set by self-referencing two teeth of the CC 104 as shown in FIG. 1. As known, in order to enable such self-referencing, the CC 104 spans an optical octave. Thus, the absolute frequency of the teeth of the CC 104 is set by setting a frequency offset, $f_o$, 120 for the CC 104 in a self-referencing interferometer (block 208). For example, there are many pairs of teeth $(n_1, n_2)$ in the CC 104 which might satisfy the relation that 2*frequency($n_1$) is approximately equal to frequency($n_2$) (i.e., a pair of teeth that are an octave apart). The optical frequency of each tooth can be written frequency($n_1$)=$f_o$+$n_1$*CCS. If the $n_1$ tooth is doubled in a nonlinear medium, and a heterodyne beat note is made with the $n_2$ tooth, the beat note may be processed to identify the frequency offset 120. The frequency offset 120 can be as large as CCS/2 in the worst case which may be too high in frequency to detect directly with a photo-receiver. Accordingly, if the self-referencing beat note frequency is outside the bandwidth of the detector, no beat note will be observed. If no beat note is observed, the pump laser(s) 114 for the FC 102 and CC 104 can be swept (up and/or down) to find the beat note, but need not be swept by more than ½*CCS 108. The beat note can be detected with a processing device 128 and appropriate detectors. The processing device 128 can then send a signal to the pump 124 for the coarse comb to adjust the frequency 126 of the pump 124 in order to set the frequency offset at the desired point. In an alternative example, instead of using a self-referencing interferometer, the frequency offset is set by referencing the pump 124 (i.e., the m tooth of the CC 104) to another sufficiently stable laser, such as the output of an optical atomic clock.

Figure 6A:
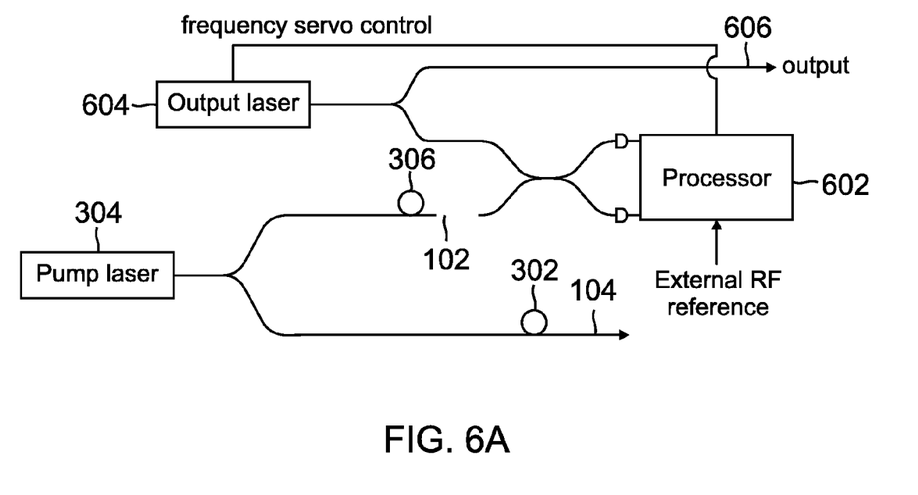
FIG. 6A is a diagram illustrating an example optical frequency synthesizer utilizing the mutually-referenced optical frequency combs of FIG. 1.
Figure 6B:
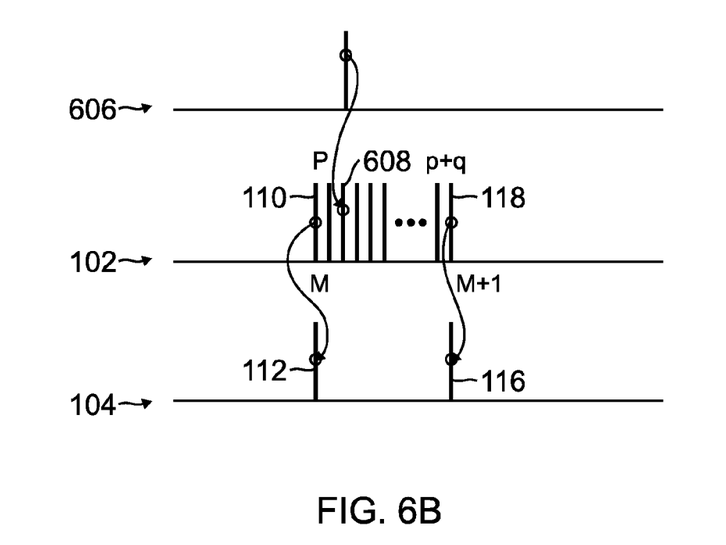
FIG. 6B is a graph illustrating an example output light from the optical frequency synthesizer of FIG. 6A along with a portion of the fine comb and the coarse comb.

In an example, the combs 100 can be used as an optical reference for an optical synthesizer. An example of such an optical synthesizer 600 is shown in FIG. 6A. In addition to the FC 102 and the CC 104, the optical synthesizer 600 can include a processing device (e.g., a microprocessor) 602 and an output laser 604. The processing device 602 is coupled to the output laser 604 and the FC 102, such that the processing device 602 can detect a frequency difference between the light 606 from the output laser 604 and a selected tooth of the FC 102. The processing device 602 is also configured to control the output laser 604 to adjust the frequency of the light therefrom. In an example, the processing device 602 is a direct digital synthesizer (DDS) that operates in the microwave band based on an external RF reference signal. FIG. 6B illustrates an example graph illustrating the mutually locked FC 102 and the CC 104 along with the output light 606 from the output laser 304.

The lock between the first tooth 110 and the second tooth 112, the lock between the FCS 106 and the RF reference, the lock between the third tooth 116 and the fourth tooth 118, and the lock of the pump 124 for the CC 104 are all maintained concurrently to provide the mutually-referenced combs 100. By locking the first tooth 110 to the second tooth 112 and by locking the FCS 106 to the CCS 108, the frequency offset of the FC 102 can be set even if the FC 102 does not span an optical octave by setting the frequency offset 120 of the CC 104 which automatically sets the frequency offset of the FC 102 by virtue of the FC 102 being locked to the CC 104. In particular, the FC 102 and CC 104 outputs slide (up and/or down) in concert with the pump laser(s) 114. The CCS 108 does not change as this occurs since it is locked to the integer multiple of the FCS 106. In this way, the frequency offset of the FC 102 can be set (e.g., adjusted) even though the FC 102 may not span an optical octave.

In an example, the combs 100 can be used as an optical reference for an optical synthesizer. An example of such an optical synthesizer 600 is shown in FIG. 6A. In addition to the FC 102 and the CC 104, the optical synthesizer 600 can include a processing device (e.g., a microprocessor) 602 and an output laser 604. The processing device 602 is coupled to the output laser 604 and the FC 102, such that the processing device 602 can detect a frequency difference between the light 606 from the output laser 604 and a selected tooth of the FC 102. The processing device 602 is also configured to control the output laser 604 to adjust the frequency of the light therefrom. In an example, the processing device 602 is a direct digital synthesizer (DDS) that operates in the microwave band based on an external RF reference signal. FIG. 3B illustrates an example graph illustrating the mutually locked FC 102 and the CC 104 along with the output light 606 from the output laser 304.

In operation, the FC 102 and the CC 104 are mutually referenced as discussed above. The processing device 602 receives a signal indicating a desired output frequency for the light 606 from the output laser 604. This signal can be received from any suitable source, such as a higher level computing system, which receives inputs from a human. The processing device 602 selects a tooth 608 of the FC 102 that is nearby the desired output frequency. In an example, the processing device 602 selects the tooth 608 of the FC 102 that is closest to the desired output frequency. The processing device 602 then detects a frequency difference between the selected tooth 608 of the FC 102 and the frequency of the light 606 from the output laser 604. Based on the detected frequency difference, the processing device 602 controls the output laser 604 such that the light 606 is set at the desired output frequency. In particular, the processing device 602 controls the output laser 604 such that the light 606 therefrom is set at an optical offset frequency away from the selected tooth 608 of the FC 102, where the optical offset frequency is equal to the difference between the desired output frequency and the frequency of the selected tooth 608 of the FC 102. In particular, the processing device 602 can generate a frequency signal that is sent to the output laser 604, and the frequency of the light 606 generated by the output laser 604 is based on the frequency of the signal received from the processing device 602 (e.g., DDS). The frequency of the signal sent from the processing device 602 (e.g., DDS) to control the output laser 604 is referred to herein as the delta frequency.

Based on the input signals received indicated the desired output frequency for the output light 606, the processing device 602 can control the frequency of the light 606 by adjusting the delta frequency and/or which tooth of the FC 102 is selected. In an example, the FCS 106 is set to 20 GHz or less in order to match with the tuning range of the processing device 602 (e.g., DDS). In an example, the delta frequency is set to a frequency between 0 Hz and FCS 106, which can be done with sub-hertz accuracy with the processing device 602 (e.g., DDS).

In an example, the CCS 108 is at least 10 times larger than the FCS 106. Such a difference in frequency spacing provides for the optical synthesizer 600 a wide overall frequency range based on the CCS 108 and a fine frequency resolution based on the FCS 106 with a relatively low power requirement. In an implementation of this example, the CCS 108 is at least 50 times larger than the FCS 106.

EXAMPLE EMBODIMENTS

Example 1 includes an optical frequency reference comprising: a fine optical frequency comb having a first tooth and a frequency spacing (FCS) between teeth that is locked to a fractional or integer multiple of a radio frequency reference;

and a coarse optical frequency comb having a second tooth that is locked to the first tooth and a frequency spacing (CCS) between teeth that is locked to an integer multiple of the FCS, wherein an absolute optical frequency of at least one tooth of the coarse optical frequency comb is set.

Example 2 includes the optical frequency reference of Example 1, wherein the CCS is at least 10 times larger than the FCS.

Example 3 includes the optical frequency reference of any of Examples 1-2, wherein the fine optical frequency comb does not span an octave.

Example 4 includes the optical frequency reference of any of Examples 1-3, wherein the CCS is locked to an integer multiple of FCS by locking a third tooth of the coarse optical frequency comb to a fourth tooth of the fine optical frequency comb.

Example 5 includes the optical frequency reference of Example 4, wherein the third tooth is an adjacent tooth to the second tooth such that the third tooth is separated from the second tooth by the CCS.

Example 6 includes the optical frequency reference of any of Examples 4-5, wherein the third tooth is locked to the fourth tooth by setting a free spectral range (FSR) of a resonator for the coarse optical frequency comb such that a beat frequency between a mixing of the fine optical frequency comb and the coarse optical frequency comb corresponds to the third tooth being aligned with the fourth tooth.

Example 7 includes the optical frequency reference of any of Examples 1-6, wherein the radio frequency reference is derived from one of parametric seeding of a resonator or a closed loop servo control of a resonator.

Example 8 includes the optical frequency reference of any of Examples 1-7, wherein the second tooth is locked to the first tooth by one of using a common pump laser to pump the fine optical frequency comb and the coarse optical frequency comb or by using a first pump laser for the fine optical frequency comb and a second pump laser for the coarse optical frequency comb, wherein the first pump laser and the second pump laser are locked to one another.

Example 9 includes the optical frequency reference of any of Examples 1-8, wherein the absolute optical frequency of the at least one tooth is set by one of self-heterodyned interferometry or by referencing the at least one tooth to a sufficiently stable laser.

Example 10 includes a method for mutually-referencing two optical frequency combs, the method comprising: locking a first tooth of a fine optical frequency comb to a second tooth of a coarse optical frequency comb; locking a frequency spacing of the fine optical frequency comb to a fractional or integer multiple of a radio frequency reference; locking a frequency spacing of the coarse optical frequency comb to an integer multiple of the frequency spacing of the fine optical frequency comb; and setting a frequency offset of the coarse optical frequency comb.

Example 11 includes the method Example 10, wherein locking the frequency spacing of the coarse optical frequency comb to an integer multiple of the frequency spacing of the fine optical frequency comb includes locking a third tooth of the coarse optical frequency comb to a fourth tooth of the fine optical frequency comb.

Example 12 includes the method of Example 11, wherein the third tooth is an adjacent tooth to the second tooth such that the third tooth is separated from the second tooth by the frequency spacing of the coarse optical frequency comb.

Example 13 includes the method of any of Examples 11-12, wherein locking the third tooth to the fourth tooth includes setting a free spectral range (FSR) of a resonator for the coarse optical frequency comb such that a beat frequency between an output of the fine optical frequency comb and an output of the coarse optical frequency comb corresponds to the third tooth being aligned with the fourth tooth.

Example 14 includes the method of any of Examples 10-13, wherein the radio frequency reference is derived from one of parametric seeding of a resonator or a closed loop servo control of a resonator.

Example 15 includes the method of any of Examples 10-14, wherein locking the first tooth to the second tooth includes one of: pumping the fine optical frequency comb and the coarse optical frequency comb with a common pump laser, or pumping the fine optical frequency comb with a first pump laser and pumping the coarse optical frequency comb with a second pump laser and locking the first pump laser to the second pump laser.

Example 16 includes the method of any of Examples 10-15, wherein the frequency spacing of the coarse optical frequency comb is at least 10 times larger than the frequency spacing of the fine optical frequency comb.

Example 17 includes the method of any of Examples 10-16, wherein the fine optical frequency comb does not span an octave.

Example 18 includes the method Example 10, wherein setting the frequency offset includes one of self-referencing two teeth of the coarse optical frequency comb or referencing at least one tooth of the coarse optical frequency comb to a sufficiently stable laser.

Example 19 includes an optical synthesizer, comprising: a fine optical frequency comb having a first tooth and a second tooth and a frequency spacing (FCS) between teeth that is locked to a fractional or integer multiple of a radio frequency reference; and a coarse optical frequency comb having a third tooth and a fourth tooth, wherein the third tooth is locked to the first tooth and the fourth tooth is locked to the second tooth, wherein a frequency offset for the coarse optical frequency comb and the fine optical frequency comb is set by self-referencing two teeth of the coarse optical frequency comb; an output laser; and a direct digital synthesizer (DDS) operating in the microwave band, the DDS configured to: detect a difference in frequency between a selected tooth of the fine optical frequency comb and the output laser; and adjust the output laser based on the detected difference to set the output laser to a desired frequency.

Example 20 includes the optical synthesizer of Example 19, wherein the fourth tooth is an adjacent tooth to the third tooth such that the fourth tooth is separated from the third tooth by a frequency spacing of the coarse optical frequency comb, wherein the fourth tooth is locked to the second tooth by setting a free spectral range (FSR) of a resonator for the coarse optical frequency comb such that a beat frequency between an output of the fine optical frequency comb and an output of the coarse optical frequency comb corresponds to the fourth tooth being aligned with the second tooth, wherein the third tooth is locked to the first tooth by one of using a common pump laser to pump the fine optical frequency comb and the coarse optical frequency comb or by using a first pump laser for the fine optical frequency comb and a second pump laser for the coarse optical frequency comb, wherein the first pump laser and the second pump laser are locked to one another.

What is claimed is:

1. An optical frequency reference comprising:
   a first micro-resonator and a second micro-resonator; and
   at least one pump laser configured to:
      pump the first micro-resonator to generate a fine optical frequency comb having a first tooth and a frequency spacing (FCS) between teeth that is locked to a fractional or integer multiple of a radio frequency reference; and pump the second micro-resonator to generate a coarse optical frequency comb having a second tooth that is locked to the first tooth and a frequency spacing (CCS) between teeth that is locked to an integer multiple of the FCS, wherein an absolute optical frequency of at least one tooth of the coarse optical frequency comb is set.

2. The optical frequency reference of claim 1, wherein the CCS is at least 10 times larger than the FCS.

3. The optical frequency reference of claim 1, wherein the fine optical frequency comb does not span an octave.

4. The optical frequency reference of claim 1, wherein the CCS is locked to an integer multiple of FCS by locking a third tooth of the coarse optical frequency comb to a fourth tooth of the fine optical frequency comb.

5. The optical frequency reference of claim 4, wherein the third tooth is an adjacent tooth to the second tooth such that the third tooth is separated from the second tooth by the CCS.

6. The optical frequency reference of claim 4, wherein the third tooth is locked to the fourth tooth by setting a free spectral range (FSR) of a resonator for the coarse optical frequency comb such that a beat frequency between a mixing of the fine optical frequency comb and the coarse optical frequency comb corresponds to the third tooth being aligned with the fourth tooth.

7. The optical frequency reference of claim 1, wherein the radio frequency reference is derived from one of parametric seeding of a resonator or a closed loop servo control of a resonator.

8. The optical frequency reference of claim 1, wherein the second tooth is locked to the first tooth by one of using a common pump laser to pump the fine optical frequency comb and the coarse optical frequency comb or by using a first pump laser for the fine optical frequency comb and a second pump laser for the coarse optical frequency comb, wherein the first pump laser and the second pump laser are locked to one another.

9. The optical frequency reference of claim 1, wherein the absolute optical frequency of the at least one tooth is set by one of self-heterodyned interferometry or by referencing the at least one tooth to a sufficiently stable laser.

10. A method for mutually-referencing two optical frequency combs, the method comprising:
generating a fine optical frequency comb by pumping a first micro-resonator with at least one pump laser;
generating a coarse optical frequency comb by pumping a first micro-resonator with at least one pump laser;
locking a first tooth of the fine optical frequency comb to a second tooth of the coarse optical frequency comb;
locking a frequency spacing of the fine optical frequency comb to a fractional or integer multiple of a radio frequency reference;
locking a frequency spacing of the coarse optical frequency comb to an integer multiple of the frequency spacing of the fine optical frequency comb; and
setting a frequency offset of the coarse optical frequency comb.

11. The method claim 10, wherein locking the frequency spacing of the coarse optical frequency comb to an integer multiple of the frequency spacing of the fine optical frequency comb includes locking a third tooth of the coarse optical frequency comb to a fourth tooth of the fine optical frequency comb.

12. The method of claim 11, wherein the third tooth is an adjacent tooth to the second tooth such that the third tooth is separated from the second tooth by the frequency spacing of the coarse optical frequency comb.

13. The method of claim 11, wherein locking the third tooth to the fourth tooth includes setting a free spectral range (FSR) of a resonator for the coarse optical frequency comb such that a beat frequency between an output of the fine optical frequency comb and an output of the coarse optical frequency comb corresponds to the third tooth being aligned with the fourth tooth.

14. The method of claim 10, wherein the radio frequency reference is derived from one of parametric seeding of a resonator or a closed loop servo control of a resonator.

15. The method of claim 10, wherein locking the first tooth to the second tooth includes one of: pumping the fine optical frequency comb and the coarse optical frequency comb with a common pump laser, or pumping the fine optical frequency comb with a first pump laser and pumping the coarse optical frequency comb with a second pump laser and locking the first pump laser to the second pump laser.

16. The method of claim 10, wherein the frequency spacing of the coarse optical frequency comb is at least 10 times larger than the frequency spacing of the fine optical frequency comb.

17. The method of claim 10, wherein the fine optical frequency comb does not span an octave.

18. The method claim 10, wherein setting the frequency offset includes one of self-referencing two teeth of the coarse optical frequency comb or referencing at least one tooth of the coarse optical frequency comb to a sufficiently stable laser.

19. An optical synthesizer, comprising:
a fine optical frequency comb having a first tooth and a second tooth and a frequency spacing (FCS) between teeth that is locked to a fractional or integer multiple of a radio frequency reference; and
a coarse optical frequency comb having a third tooth and a fourth tooth, wherein the third tooth is locked to the first tooth and the fourth tooth is locked to the second tooth, wherein a frequency offset for the coarse optical frequency comb and the fine optical frequency comb is set by self-referencing two teeth of the coarse optical frequency comb;
an output laser; and
a direct digital synthesizer (DDS) operating in the microwave band, the DDS configured to:
detect a difference in frequency between a selected tooth of the fine optical frequency comb and the output laser; and
adjust the output laser based on the detected difference to set the output laser to a desired frequency.

20. The optical synthesizer of claim 19, wherein the fourth tooth is an adjacent tooth to the third tooth such that the fourth tooth is separated from the third tooth by a frequency spacing of the coarse optical frequency comb,
wherein the fourth tooth is locked to the second tooth by setting a free spectral range (FSR) of a resonator for the coarse optical frequency comb such that a beat frequency between an output of the fine optical frequency comb and an output of the coarse optical frequency comb corresponds to the fourth tooth being aligned with the second tooth,
wherein the third tooth is locked to the first tooth by one of using a common pump laser to pump the fine optical frequency comb and the coarse optical frequency comb or by using a first pump laser for the fine optical frequency comb and a second pump laser for the coarse optical frequency comb, wherein the first pump laser and the second pump laser are locked to one another.

* * * * *